United States Patent [19]
Lapeyre

[11] 3,896,522
[45] July 29, 1975

[54] APPARATUS FOR REMOVING MEAT FROM ANIMAL BONE

[75] Inventor: James M. Lapeyre, New Orleans, La.

[73] Assignee: The Laitram Corporation, New Orleans, La.

[22] Filed: July 20, 1973

[21] Appl. No.: 381,345

[52] U.S. Cl. ................................ 17/46; 17/1 G
[51] Int. Cl. ............................................. A22c 17/04
[58] Field of Search ........................ 17/1 G, 18, 46

[56] References Cited
UNITED STATES PATENTS
2,734,537  2/1956  Geisler .................................. 17/1 G
2,761,479  9/1956  Geisler et al .......................... 17/1 G

*Primary Examiner*—Paul E. Shapiro
*Attorney, Agent, or Firm*—Weingarten, Maxham & Schurgin

[57] ABSTRACT

Apparatus for the separation of meat from the bones of fowl or other animals or animal parts. One or more drums are arranged for rotation about an axis removed from the drum to provide an intended centrifugal force to fowl introduced therein. The drum or drums are also rotatable about their own respective axes to provide a constantly changing outer-lying wall surface for engagement with the fowl. The drum walls are formed of a grid of cutting edges for separating meat from the bone and whose interstices form apertures through which the separated meat is removed from the drum by action of centrifugal force.

A method for removing meat from animal bones comprising the steps of; moving a grid of cutting elements in a closed path about its axis; revolving the grid about an axis; revolving the grid about an axis removed from the grid axis; supplying meat-containing bone to the grid; removing meat from an outer portion of the grid; and removing bone from an inner portion of the grid.

14 Claims, 8 Drawing Figures

PATENTED JUL 29 1975 3,896,522

SHEET 1

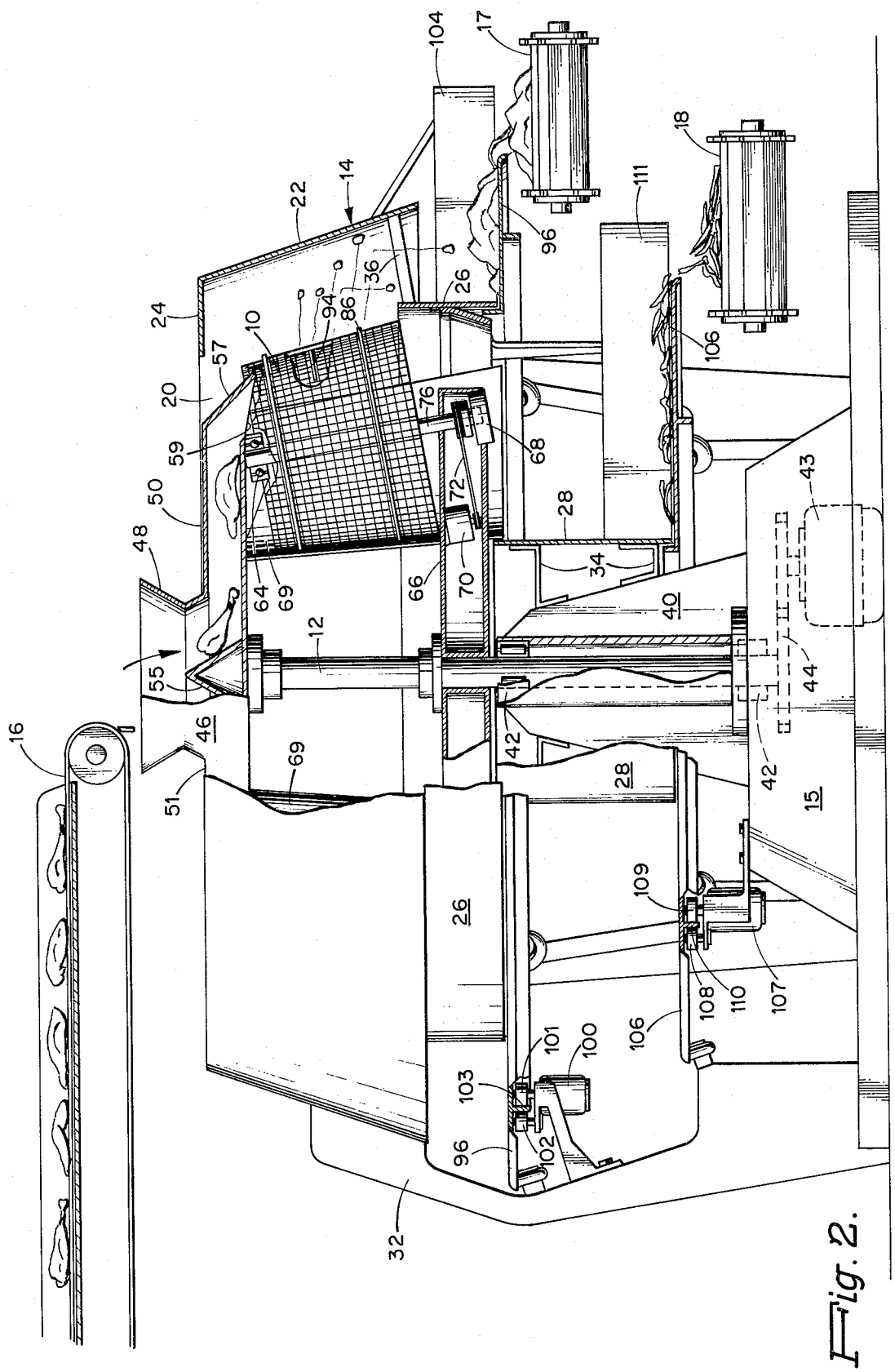

APPARATUS FOR REMOVING MEAT FROM ANIMAL BONE

FIELD OF THE INVENTION

This invention relates to apparatus for deboning meat and more particularly to apparatus for removal of meat from the bone structure of fowl or other animals or animal parts.

BACKGROUND OF THE INVENTION

Various forms of apparatus have been proposed to accomplish separation and removal of meat from an associated bone structure; however, such apparatus has not been wholly satisfactory and has not enjoyed any substantial commercial usage. In many prior art machines for removing meat from bone, animal parts are caused to impact with a wall or other obstructing member, the force of impact causing separation of the meat from the bone. Typical apparatus of this type is shown in U.S. Pat. Nos. 2,734,537, 2,734,540, 2,858,222 and 3,017,661. In other forms of prior art apparatus, such as shown in U.S. Pat. Nos. 3,256,555 and 3,514,808, animal parts are caused to move along a path containing tines or blades which pick away the meat as the parts move in their travel path. A further form of meat removal has been proposed, for example, in U.S. Pat. Nos. 2,851,362, 3,248,752 and 3,478,385, wherein high pressure fluid jets are directed at the animal parts to force the meat from its bone.

SUMMARY OF THE INVENTION

In accordance with the present invention relatively simple apparatus is provided for the efficient removal of meat from animal bones and for the separate collection of meat and bone into segregated supplies for subsequent processing. The invention is especially useful and will be described in the context of the processing of fowl or fowl parts, although the invention is also useful for other animal carcasses and parts thereof.

Briefly, the invention comprises one or more drums arranged for rotation in an orbit about a central axis to provide an intended centrifugal force. The drum or drums are also rotatable about their own axes at a rate substantially slower than the rotation of the drum assembly to cause rotation of fowl or fowl parts introduced therein. Each drum is formed of a grid of elements having cutting edges directed inward to engage fowl parts which are caused to move along the inside surface of the drum by the combined rotation of the drum and the drum assembly. The meat is separated from the bone by combined action of the engaging cutting edges, the centrifugal force provided and the rotation of the drum, and the removed meat is caused to pass through the grid for collection while the bones from which the meat has been thus removed falls from the bottom of the drum for separate collection.

DESCRIPTION OF THE DRAWING

The invention will be more fully understood from the following detailed description, taken in conjunction with the accompanying drawing, wherein:

FIG. 2 is a partially cutaway elevational view of the embodiment of FIG. 1;

DETAILED DESCRIPTION OF THE INVENTION

Figure 1:
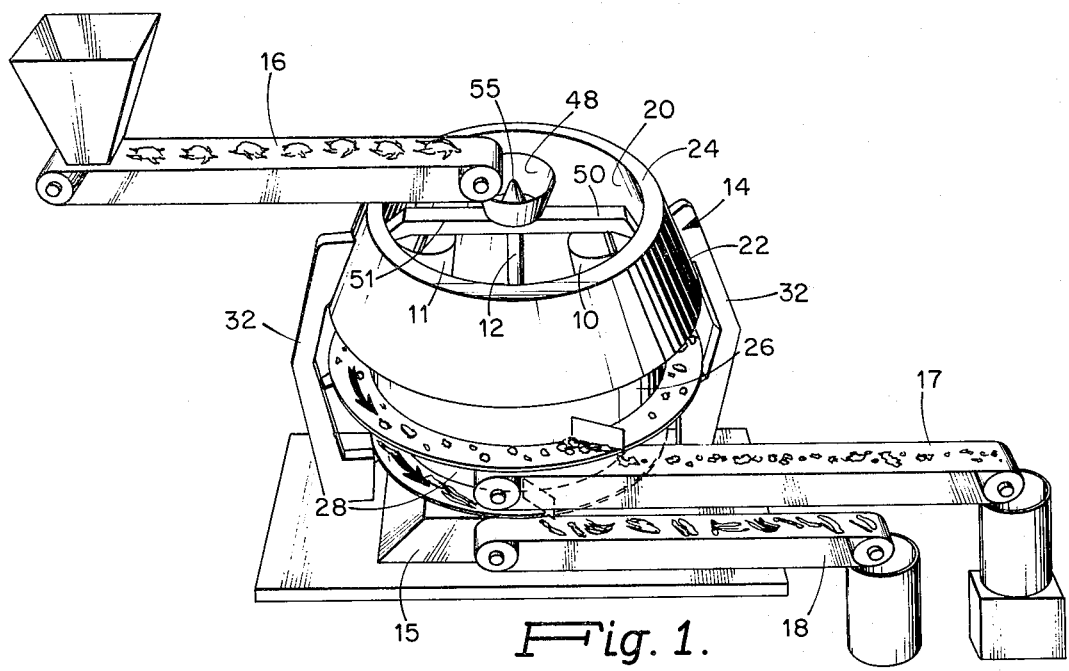
FIG. 1 is a pictorial view of deboning apparatus constructed in accordance with the invention.

The invention is illustrated in a preferred embodiment in FIGS. 1 and 2, wherein a fowl deboning apparatus is shown having a pair of drums 10 and 11 mounted for rotation about a vertical shaft 12 and disposed within a housing indicated generally at 14. Housing 14 is of generally cylindrical configuration defining a top aperture 20, and includes a conical-shaped cover portion 22 having a horizontally disposed annular portion 24, and cylindrical walls 26 and 28 of smaller diameter than that of cover 22. Cover 22 and walls 26 and 28 are mounted in fixed relationship to a base structure 15 by means of mounting braces 32, 34 and 36, as illustrated. Supply transport means 16 and meat bone transport means 17 and 18, typically conveyor belts having suitable configuration and surface characteristics, are provided, respectively, to supply fowl to the apparatus and to remove separated meat and bones therefrom for conveyance to suitable receptacles. Housing 14 may be formed of any suitable sheet material, typically stainless steel for ease of cleaning. Similarly, the materials employed in the conveyor belts should be adapted for relatively easy and efficient cleaning.

Drive shaft 12 is disposed along the vertical axis of housing 14 and supported by an upstanding support member 40 affixed to base 15, and having bearings 42 to permit shaft rotation with respect to member 40. The drive shaft is powered for rotation by driving means, typically including an electric motor 43 and a drive belt 44 coupling the motor to the lower end of shaft 12 by associated pulleys. A member 46, including a funnel-shaped receptacle portion 48 and oppositely extending longitudinal chute portions 50 and 51, is affixed to drive shaft 12 at the upper end thereof for rotation therewith. Chute portions 50 and 51 are typically of rectangular cross-section and lie generally in a horizontal plane within cover 22. The respective outlying end portions of the chutes include an angled wall 57 and a bottom opening 59. In an alternative embodiment, the chutes may be inclined downward from the horizontal as they extend outward from the drive shaft in order to enhance the action of gravitational forces on the fowl passing therethrough.

In the operation of the apparatus of the invention, whole fowl or pieces thereof are introduced into receptacle 48 and are deflected by a deflector 55 toward either of the chutes. Rapid rotation of the chutes about shaft 12 causes a centrifugal force to be applied to the fowl at the bottom of receptacle 48 and in the chutes, propelling it outwardly through the chutes toward bottom openings 59 through which it falls into the respective drums 10 and 11.

Drums 10 and 11 are disposed within housing 14 and are rotatably mounted onto respective chutes 50 and 51 by bearings 64, and onto a drum support member 66 by bearings 68 to permit revolution of the drums about the axis defined by drive shaft 12 as well as rotation of each drum about its respective axis. Drum support member 66 is typically a relatively narrow longitudinal member which is fixed to the rotating drive shaft 12 for rotation therewith. A curved shroud 69 is mounted onto member 46 and drum support member 66 for rotation therewith and disposed in spaced relation with respective drums 10 and 11. The shroud 69 is typically of U-shaped configuration with its opening facing the outermost section of the drum, through which deboned meat is propelled. Bearings 64 and 68 are typically conventional friction reducing roller bearings. Drum driving means typically including an electric motor 70 coupled by a drive belt or chain 72 to shaft 76 by associated pulleys and typically mounted within the drum support means 66, provide rotation of the respective drums.

Figure 3:
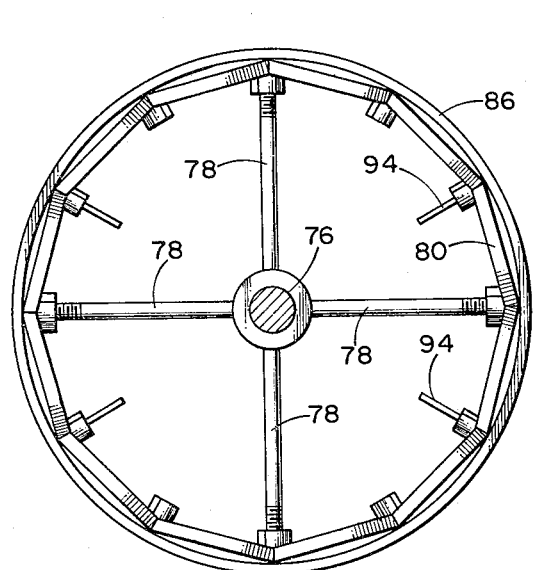
FIG. 3 is a partially cutaway top view of a rotary drum employed in the embodiment of FIGS. 1 and 2.
Figure 4:
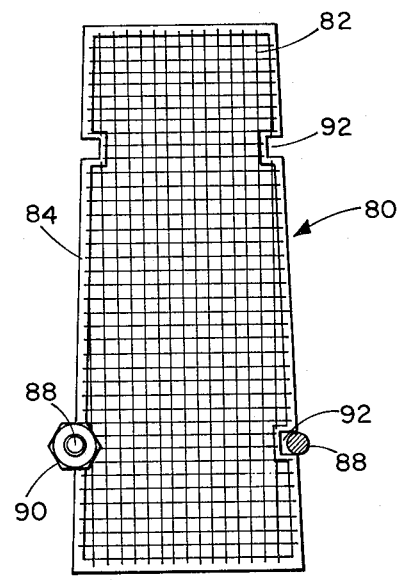
FIG. 4 is an elevation view of a section of the drum of FIG. 3.
Figure 5:
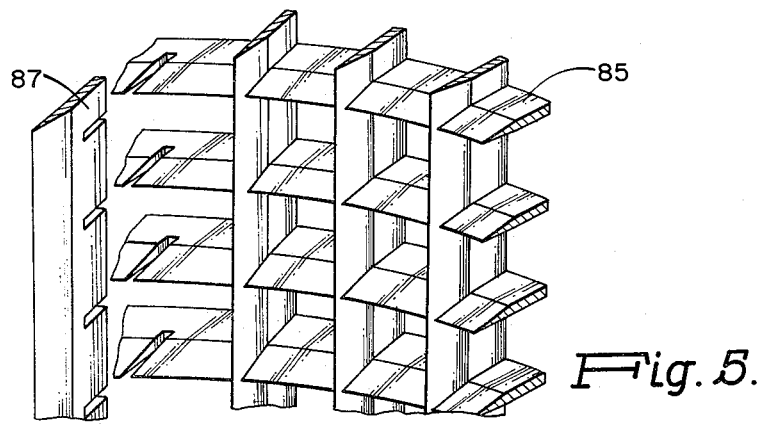
FIG. 5 is a cutaway pictorial view of one means of constructing the drum of the invention.

The advantageous construction of drums 10 and 11 can be more fully appreciated by additional reference to FIGS. 3, 4 and 5. The precise construction and mounting of drum 10 will now be described in detail, it being understood that drum 11 is similarly constructed and mounted. As seen in FIG. 2, drum 10 is formed with a tapered wall terminating at top and bottom open ends and having a larger bottom diameter. The drum wall is mounted to an axially disposed shaft 76 by means of spokes 78.

Figure 8:
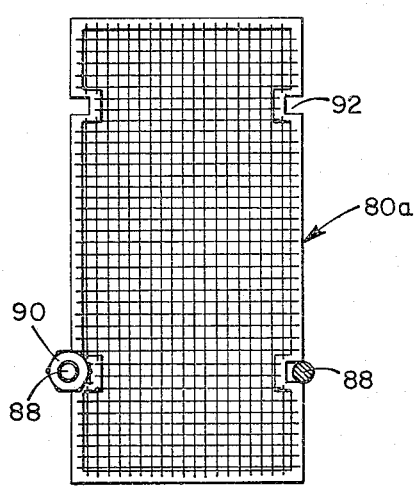
FIG. 8 is an elevation view of a section of the drum of FIG. 7.
Figure 6:
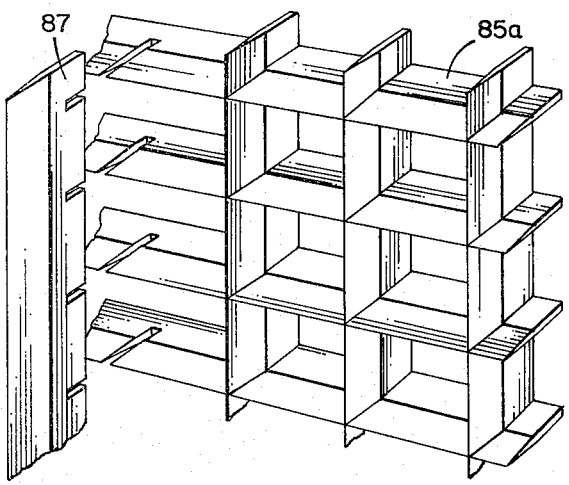
FIG. 6 is a cutaway pictorial view of an alternative means of constructing the drum of the invention.
Figure 7:
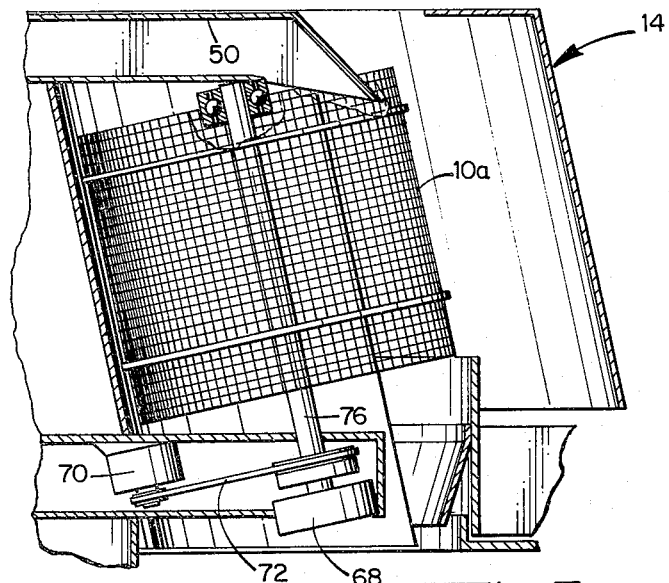
FIG. 7 is a partially cutaway elevation view of an alternative embodiment of the invention.

The drum wall is typically formed of a plurality of generally trapazoidal sections 80, each of which contains a grid of cutting edges. The cutting edges may be formed by small diameter wires 82 arranged in a perpendicular grid matrix and mounted onto a frame 84, as seen in FIG. 4. Alternatively, the cutting edges may be formed by notched interlocking knife blades as illustrated in FIGS. 5 and 6. In FIG. 5, the horizontal knife blades 85 are curved to define the circumferential drum surface, while in FIG. 6 the horizontal blades 85 are of straight configuration to form a segmented drum as in the embodiment of FIG. 3. The knife blades can be oriented radially inward toward the center of the basket or in alternative embodiment some or all of the knife edges may be oriented at a selected angle disposed from the radial direction and against the path of the fowl along the inner wall of the drum to enhance cutting efficiency during operation. As shown in FIG. 7 the drum 10a can be of cylindrical configuration rather than tapered as in the embodiment described above and can be formed, for example, by rectangular sections 80a as depicted in FIG. 8, each of which is composed of a grid of cutting edges.

Referring again to FIGS. 3 and 4, wall sections 80 are attached to one or more support rings 86 by bolts 88 engaging retaining nuts 90 or other fastening means which engage respective slots 92 in sections 80. Sections of the drum walls may thus be easily removed and replaced by loosening respective retaining nuts and removing one or more sections, without the necessity of disassembling the entire drum wall. Spikes 94 are provided extending radially inward from the drum wall toward the center of the drum at selected points on the inner surface of the drum for a purpose which will hereinafter be described. The spikes may be formed as extensions of retaining bolts 88, or alternatively may be provided as separate elements attached to the drum wall at selected locations.

Shaft 76 extends downward and outward to orient drum 10 in angular disposition as illustrated in FIG. 2. Drum 10 is mounted to engage the bottom opening 59 of chute 50 so that during operation of the apparatus, the fowl travelling through the chute enters drum 10. The drum is mounted so that its outer walls are generally parallel and in selected spaced relationship with surface 24 of cover member 22. As described above, drums 10 and 11 are symmetrically mounted with respect to the axis defined by drive shaft 12 for balanced rotation thereabout.

In an alternative embodiment of the invention, a single drum 10 may be employed together with a single chute 50, with a suitable counterbalancing weight being provided to enable balanced rotation to take place about drive shaft 12. In a further alternative embodiment of the invention, more than two drums may be employed together with respective chutes for providing a pathway from a central receptacle to the respective drums.

A rotatable annular table 96 is disposed in a horizontal plane extending outwardly from wall 26 and underlying the area between wall 26 and cover 22 of housing 14 for collection of meat passing out of drums 10 and 11 through the apertures in the drum walls. Meat collection table 96 is driven for rotation by an electric motor 100 coupled to a drive roller 101 which cooperates with a pinch roller 102 to drive a vertical flange 103 depending from table 96, to provide rotation of the table at a typical rate of 1 rpm. A plate 104 is affixed to wall 26 and is disposed outwardly across table 96 and slightly spaced above the moving surface thereof to serve as a deflector for diverting meat collected on table 96 onto conveyor 17 disposed adjacent thereto.

A second annular table 106 is similarly disposed between inner cylindrical wall 28 and outer cylindrical wall 26 and underlies the open bottom portion of drums 10 and 11 to receive bones and other matter falling therefrom. Bone collection table 106 is driven for rotation at a typical rate of 1 rpm by an electric motor 107 and associated rollers 108 and 109 which engage flange 110 depending from table 106.

Plate 111 is affixed to wall 28, and is disposed outwardly across table 106 and slightly spaced above the moving surface thereof to serve as a deflector for diverting bones collected on table 106 onto conveyor 18 disposed adjacent thereto.

In the operation of the apparatus of the invention, whole or cut-up fowl in either a cooked or raw state is continuously provided to the funnel-shaped receptacle 48 by supply means 16. By the action of the drive means, drive shaft 12 is caused to rotate at a relatively high rate to provide rotation of drums 10 and 11 together with association members 46, 66 and shroud 69. A speed in the range of 550–1750 rpm is typically employed for apparatus having a spin radius of 18 inches, to produce a centrifugal force in the range of about 150–1500 G. By the action of the drum driving means each drum is caused to rotate about its axis at a slower rate of rotation than that of the drive shaft 12, typically 4 rpm. The rapid rotation of member 46 and drums 10 and 11 causes a centrifugal force to be applied to fowl lying therewithin causing the fowl to move outward through the passages in chutes 50 and 51, through openings 59 to respective drums 10 and 11.

Upon entering the drum, the fowl is urged by centrifugal force against the portion of the drum wall disposed outermost from shaft 12 and in engagement with the cutting edges of the wall. The rotation of the drum about its own axis presents a constantly changing outermost surface for engagement with the fowl centrifugally maintained in engagement therewith to provide repeated engagement of the fowl with different cutting edges and for preventing the fowl from becoming stuck in a portion of the cutting edge grid. The motion of the fowl against the cutting edges results in meat being separated from the bone structure of the fowl.

Various configurations of cutting edges may be employed to maximize cutting and meat separation by orienting the cutting surfaces so as to extend generally perpendicular to the motion of the fowl relative to the drum walls. Spikes 94 also help to maintain the fowl being deboned in motion relative to the wall of the drum by continually jolting the fowl and thus imparting to it an element of random motion, for bringing various surfaces of the fowl into engagement with the cutting edges. Due to the action of gravity the fowl will progress generally downward along the inner wall while meat is continually separated from the bone structure by the action of the cutting edges. The meat thus separated is caused by centrifugal acceleration to traverse the drum wall through apertures formed in the interstices of the cutting edge grid and to be deflected from the inner surface of cover member 22 or to fall by action of gravity to the surface of meat collection table 96. As the meat collection table 96 rotates, the meat thus collected is deflected by stationary upstanding plate 104 onto meat transport conveyor 17 which removes the meat to a suitable receptacle.

In order to enhance the cutting efficiency of the blades forming the rotary drum, the drum can have a vibratory motion imparted thereto such that vibrating knife edges are provided to engage the fowl being centrifugally forced against the inner drum surface. Vibration can be imparted to the drum such as by a suitable source within bearing 68 which can impart intended motion to the bearing and associated drum.

The dimensions of the drums and the respective rotation velocities are determined to provide a fowl travel path for which the cutting edges will remove all of the meat from the bone structure by the time that the bone structure reaches the bottom of the drum. The remaining bone structure drops out through the open bottom of the drum generally at the outlying portion thereof onto the surface of bone collection table 106. As table 106 rotates, the collected bones lying on this surface are deflected by stationary plate 112 onto a bone transport conveyor which moves the bones thus collected to a suitable receptacle. Outer cylindrical wall surface 28 prevents bones from the drum from falling onto the meat collecting table 96. Shroud 69 and wall 28 require the bones to fall onto table 106.

While the fowl deboning apparatus of the invention has been described in a preferred embodiment, it will be appreciated that variations in the implementation of the invention such as in the dimensions, configurations and numbers of drums employed, will occur to those skilled in the art, and accordingly it is intended that such variations be included within the scope of the present invention.

What is claimed is:

1. Apparatus for removing meat from animal bones comprising:

at least one generally cylindrical drum formed of a grid of cutting elements;

means for mounting said at least one drum for rotation about its axis at a first predetermined rate;

means for revolving said at least one drum about an axis removed from the drum axis at a second predetermined rate higher than said first rate to provide an intended centrifugal force;

means for supplying meat-containing bone to the upper end of said at least one drum;

means for removing meat from the outer portion of the grid of said at least one drum; and means for collecting bones from the lower end of said at least one drum.

2. Apparatus according to claim 1 wherein said at least one drum comprises a plurality of sections each of which contains a grid of cutting elements.

3. Apparatus according to claim 1 wherein a plurality of spikes extend inwardly from the drum wall for engagement with meat disposed therein.

4. Apparatus according to claim 1 wherein said grid of cutting elements comprises a plurality of longitudinal wire segments.

5. Apparatus according to claim 1 wherein said grid of cutting elements comprises a plurality of interlocking perpendicularly disposed knife edges.

6. Apparatus according to claim 1 wherein said means for removing meat from the outer portion of the grid of said at least one drum includes a rotatable table member and a deflector plate for engagement with said table member.

7. Apparatus according to claim 6 and further comprising a cover member for deflecting meat removed from the outer portion of said at least one drum onto said rotatable table member.

8. Apparatus according to claim 1 wherein said drum is of generally truncated conical configuration having a larger bottom diameter.

9. Apparatus for removing meat from the bones of fowl comprising:

a housing;

a base member including first driving means;

a drive shaft supported by said base member and driven for rotation at a first rate by said driving means to provide an intended centrifugal force;

at least one generally cylindrical drum disposed within said housing and formed of a grid of cutting elements and containing a plurality of apertures;

means for mounting said at least one drum for rotation at said first rate about an axis external of said drum and defined by said drive shaft;

means for mounting said at least one drum for rotation about its axis at a second predetermined rate slower than said first rate;

at least one second driving means for rotating said at least one drum about its axis at said second rate;

means for supplying fowl to the upper end of said at least one drum;

means for receiving meat removed through said apertures in said at least one drum; and means for collecting bones from the lower end of said at least one drum.

10. Apparatus according to claim 9 including means for vibrating said at least one drum to enhance the cutting engagement of said fowl and said grid of cutting elements.

11. Apparatus according to claim 9 wherein said fowl supplying means includes
- a hopper disposed substantially in alignment with the axis of said drive shaft;
- chute means coupled to said hopper and extending therefrom to the upper end of said at least one drum.

12. Apparatus according to claim 11 wherein said meat receiving means includes
- a first rotatable table disposed for rotation adjacent the periphery of said at least one drum for collection of meat emanating from said grid of cutting elements;
- first receptacle means; and
- means for diverting said collected meat on said first table to said first receptacle means;
- and wherein said bone collecting means includes a second rotatable table disposed for rotation below said at least one drum for collection of bone from said at least one drum;
- second receptacle means; and
- means for diverting said collected bone on said second table to said second receptacle means.

13. A substantially continuous method for removing meat from animal bones comprising the steps of:
- moving a grid of cutting elements along a predetermined continuous closed path to provide unidirectional rotation about its axis;
- revolving said grid of cutting elements about an axis removed from said grid axis to produce an intended centrifugal force;
- supplying meat-containing bone to said grid of cutting elements to cause relative movement between said meat-containing bone and said grid and engagement of said cutting elements therewith;
- removing meat from an outer portion of said grid; and
- removing bone from an inner portion of said grid.

14. The method according to claim 13 including the further step of vibrating said grid of cutting elements to enhance the engagement of said cutting elements with said meat-containing bone.

* * * * *